US011423215B2

United States Patent
Chakraborty et al.

(10) Patent No.: US 11,423,215 B2
(45) Date of Patent: Aug. 23, 2022

(54) METHOD AND APPARATUS FOR PROVIDING MULTIMODAL INPUT DATA TO CLIENT APPLICATIONS

(71) Applicant: Zebra Technologies Corporation, Lincolnshire, IL (US)

(72) Inventors: Joydeep Chakraborty, Bangalore (IN); Sudhakar Murthy, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/219,696

(22) Filed: Dec. 13, 2018

(65) Prior Publication Data

US 2020/0192974 A1   Jun. 18, 2020

(51) Int. Cl.
  *G06F 17/10*   (2006.01)
  *G06F 40/174*   (2020.01)
  *G06K 15/00*   (2006.01)
  *G06F 15/02*   (2006.01)

(52) U.S. Cl.
  CPC .......... *G06F 40/174* (2020.01); *G06F 15/025* (2013.01); *G06F 15/0225* (2013.01); *G06K 15/4045* (2013.01)

(58) Field of Classification Search
  CPC .. G06F 40/174; G06F 15/0225; G06F 15/025; G06K 15/4045
  USPC ........................................................ 715/224
  See application file for complete search history.

(56) References Cited

U.S. PATENT DOCUMENTS

| | | | |
|---|---|---|---|
| 6,012,030 A * | 1/2000 | French-St. George | H04M 1/72448 704/275 |
| 6,233,559 B1 | 5/2001 | Balakrishnan | |
| 9,600,135 B2 | 3/2017 | Nickel | |
| 9,665,911 B2 * | 5/2017 | Humpherys | G06Q 40/08 |
| 10,122,577 B1 * | 11/2018 | Rykowski | H04L 41/0803 |
| 2002/0178344 A1 * | 11/2002 | Bourguet | G06F 9/542 712/1 |
| 2003/0083879 A1 | 5/2003 | Cyr et al. | |
| 2005/0010418 A1 * | 1/2005 | McNair | G06F 3/038 704/275 |
| 2006/0007189 A1 * | 1/2006 | Gaines, III | G06F 40/174 345/179 |
| 2006/0159345 A1 | 7/2006 | Clary et al. | |

(Continued)

FOREIGN PATENT DOCUMENTS

EP     2614420 B1     7/2013

*Primary Examiner* — Shahid K Khan (57) ABSTRACT

A method of providing multimodal input data to client applications in a data capture device with multiple input assemblies includes: storing, in a memory of the device: a client application defining input fields; and a plurality of input profiles each containing an input field identifier and a modality identifier corresponding to one of the input assemblies. Via execution of the client application, the device controls a display to simultaneously render a plurality of the input fields; determines an active one of the rendered input fields and obtains an active field identifier of the active input field; retrieves an active one of the input profiles containing a field identifier that matches the active input field identifier; controls one of the input assemblies corresponding to the modality identifier of the active input profile to obtain input data; and populates the active input field with the obtained input data.

18 Claims, 7 Drawing Sheets

(56) References Cited

U.S. PATENT DOCUMENTS

| | | | |
|---|---|---|---|
| 2006/0290709 A1* | 12/2006 | Omi | G10L 15/19 345/594 |
| 2007/0024463 A1* | 2/2007 | Hall | G05B 19/042 340/10.1 |
| 2007/0052540 A1* | 3/2007 | Hall | G06K 7/10108 340/572.1 |
| 2010/0185447 A1 | 7/2010 | Krumel et al. | |
| 2011/0025842 A1* | 2/2011 | King | H04N 1/00758 348/135 |
| 2011/0137648 A1 | 6/2011 | Ljolje et al. | |
| 2012/0066600 A1* | 3/2012 | Nickel | G10L 15/26 715/727 |
| 2013/0238312 A1 | 9/2013 | Waibel | |
| 2013/0325474 A1 | 12/2013 | Levien et al. | |
| 2015/0039987 A1* | 2/2015 | Soulier | G06F 40/174 715/224 |
| 2015/0242932 A1 | 8/2015 | Beguin et al. | |
| 2015/0309561 A1* | 10/2015 | Stewart | G06F 3/01 345/156 |
| 2016/0034590 A1* | 2/2016 | Endras | G06F 16/9535 707/770 |
| 2016/0124931 A1* | 5/2016 | Fan | G06F 3/04892 715/224 |
| 2016/0147828 A1* | 5/2016 | Yu | G06F 16/3329 705/31 |
| 2016/0307017 A1* | 10/2016 | Bianconi | G06F 3/0482 |
| 2020/0192974 A1* | 6/2020 | Chakraborty | G06K 15/4045 |
| 2021/0104237 A1 | 4/2021 | Wu et al. | |

* cited by examiner

METHOD AND APPARATUS FOR PROVIDING MULTIMODAL INPUT DATA TO CLIENT APPLICATIONS

BACKGROUND

Data capture devices are used in a wide variety of environments, such as warehouses, manufacturing facilities, retail facilities, healthcare institutions, and the like. In such environments, a data capture device may be employed to capture data from objects, such as serial numbers displayed on packages in a warehouse facility, and to process the captured data (e.g. to send the data to a server) using a client application running on the data capture device.

The format of the data to be captured (e.g. the above-mentioned serial number) may change. Further, data to be captured may appear in multiple formats. Client applications may be deployed to a number of data capture devices within a facility, and altering an application to accommodate different data capture formats may therefore be costly and time-consuming.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of providing multimodal input data to client applications in a data capture device, the method comprising: storing, in a memory of the data capture device: a client application defining input fields; and a plurality of input profiles each containing (i) a field identifier corresponding to one of the input fields, and (ii) a modality identifier corresponding to one of a plurality of input assemblies of the data capture device; via execution of the client application at a processor of the data capture device, controlling a display of the data capture device to simultaneously render a plurality of the input fields; at the processor, determining an active one of the rendered input fields and obtaining an active field identifier of the active input field; retrieving, at the processor, an active one of the input profiles containing a field identifier that matches the active input field identifier; at the processor, controlling one of the input assemblies corresponding to the modality identifier of the active input profile to obtain input data; and populating the active input field with the obtained input data.

Additional examples disclosed herein are directed to data capture device, comprising: a display; a plurality of input assemblies; a memory storing: a client application defining input fields; and a plurality of input profiles each containing (i) a field identifier corresponding to one of the input fields, and (ii) a modality identifier corresponding to one of a plurality of input assemblies of the data capture device; and a processor interconnected with the display, the input assemblies and the memory, the processor configured to: execute the client application to control the display to simultaneously render a plurality of the input fields; determine an active one of the rendered input fields and obtain an active field identifier of the active input field; retrieve an active one of the input profiles containing a field identifier that matches the active input field identifier; control one of the input assemblies corresponding to the modality identifier of the active input profile to obtain input data; and populate the active input field with the obtained input data.

Further examples disclosed herein are directed to a non-transitory computer-readable medium storing instructions for execution by a processor of a data capture device to: store, in a memory: a client application defining input fields; and a plurality of input profiles each containing (i) a field identifier corresponding to one of the input fields, and (ii) a modality identifier corresponding to one of a plurality of input assemblies of the data capture device; and execute the client application to control a display to simultaneously render a plurality of the input fields; determine an active one of the rendered input fields and obtain an active field identifier of the active input field; retrieve an active one of the input profiles containing a field identifier that matches the active input field identifier; control one of a plurality of input assemblies corresponding to the modality identifier of the active input profile to obtain input data; and populate the active input field with the obtained input data.

Figure 1:
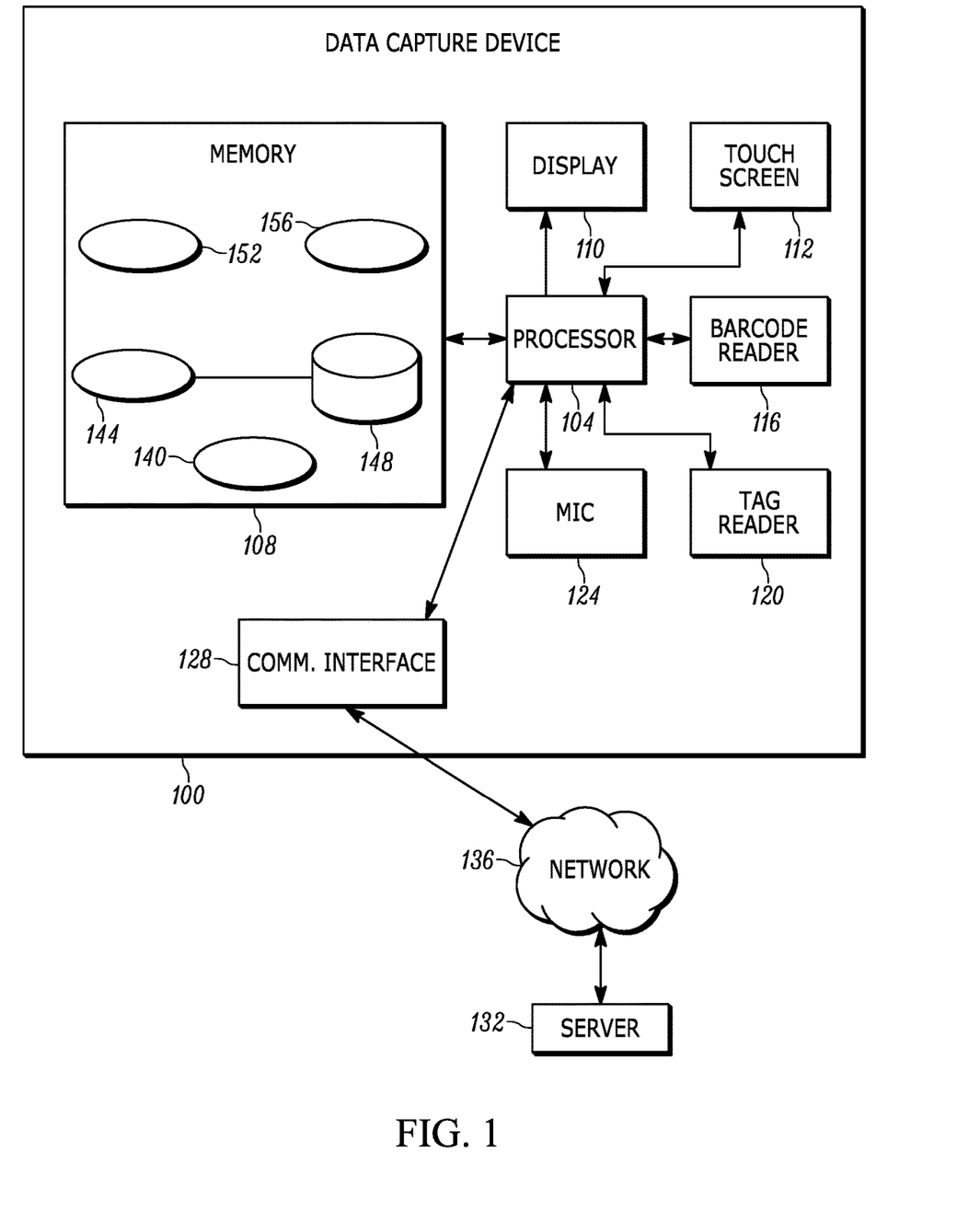
FIG. 1 is a schematic of a data capture device.

FIG. 1 depicts an example data capture device 100 in accordance with the teachings of this disclosure. The data capture device 100 includes a central processing unit (CPU), also referred to as a processor 104, interconnected with a non-transitory computer readable storage medium, such as a memory 108. The memory 108 includes any suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the processor 104 and the memory 108 each comprise one or more integrated circuits.

The data capture device 100 also includes a display 110 (e.g. an active-matrix OLED, or AMOLED, display or the like). The display 110 is configured to receive data from the processor 104 and to render or otherwise present the data to an operator of the data capture device 100. In other examples, the data capture device 100 can include additional output assemblies in addition to the display 110, such as one or more of a speaker, indicator light, and the like.

The data capture device 100 further includes a plurality of input assemblies, each including a suitable combination of hardware elements and associated microcontrollers, firmware and the like for obtaining input data and providing the input data to the processor 104. The nature of the input data obtained varies for each input assembly. In the present example, four input assemblies are illustrated. In particular, the input assemblies include a touch screen 112 configured to receive touch input. The touch screen 112 can be integrated with the display 110. The input assemblies of the data capture device 100 also include a barcode reader 116 controllable to capture barcodes. The barcode reader 116 includes any suitable one of, or any suitable combination of, imaging sensors, light emitters (e.g. laser emitters), reflectors and the like enabling the barcode reader 116 to capture and decode barcodes.

The input assemblies of the data capture device 100 further include a wireless tag reader 120 containing one or more transceivers and associated modulation and encoding components, for reading data from a wireless tag. For example, the tag reader 120 can be a radio frequency identification (RFID) reader. The input assemblies of the data capture device 100 also include a microphone 124, configured to capture audio for provision to the processor 104.

The data capture device 100 also includes a communications interface 128 interconnected with the processor 104. The communications interface 128 includes any suitable components (e.g. transmitters, receivers, network interface controllers and the like) allowing the data capture device 100 to communicate with other computing devices such as a server 132, either directly or via a network 136 (e.g. a local or wide-area network, or a combination thereof). The specific components of the communications interface 128 are selected based on the type of network or other communication links that the data capture device 100 is required to communicate over.

The various components of the data capture device 100 are interconnected, for example via one or more communication buses. The device 100 also includes a power source for supplying the above-mentioned components with electrical power. In the present example, the power source includes a battery; in other examples, the power source includes a wired connection to a wall outlet or other external power source in addition to or instead of the battery. The data capture device 100 also includes a housing supporting the components mentioned above. In some examples, the housing is a unitary structure supporting all other components of the data capture device 100. In other examples, the housing is implemented as two or more distinct (e.g. separable) housing components, such as a first component comprising a pistol-grip handle including a cradle configured to receive a second component comprising the housing of a smartphone, tablet computer, or the like.

The memory 108 stores one or more applications, each including a plurality of computer readable instructions executable by the processor 104. The execution of the above-mentioned instructions by the processor 104 causes the data capture device 100 to implement certain functionality discussed herein. The processor 104, as configured via the execution of the above-mentioned applications, may be referred to as a data capture controller. In particular, the memory 108 stores an operating system 140 that, as will be apparent to those skilled in the art, includes instructions executable by the processor 104 for interoperating with the other components of the data capture device 100 (e.g. device drivers and the like). The memory 108 also stores an input service application 144 (also simply referred to below as the input service 144) and an associated input profile repository 148, which will be discussed in greater detail herein. In addition, the memory 108 stores at least one client application. In the present example, two client applications 152 and 156 are illustrated. As will be apparent to those skilled in the art, in other embodiments the data capture device 100 may store only one client application, while in further embodiments the data capture device 100 may store a greater number of client applications than the two illustrated.

The client applications 152 and 156, when executed by the processor 104, implement any of a variety of functionality desired by an entity operating the data capture device 100. For example, assuming that the data capture device 100 is deployed in a warehouse facility, the application 152 may configure the data capture device 100 to capture data from objects (e.g. packages) received at the warehouse and provide such data to the server 132. The application 156 may configure the data capture device 100 to obtain (e.g. from the server 132) pick lists of packages to be collected together for shipping.

In general, each of the client applications stored in the memory 108 is configured to prompt an operator of the data capture device 100 for input data by rendering one or more input fields on the display 110. As will be discussed in greater detail below, the format of the input data to be collected in such input fields may vary, and may also change over time. For example, product identifiers on packages received at the above-mentioned warehouse may be encoded in barcodes for a period of time, and may subsequently be carried on RFID tags (e.g. when the types of labels used to mark the packages are switched to labels with inlaid RFID tags). In further examples, the input data to be collected for one or more fields of the application 152 may vary in different locations of a facility such as the above-mentioned warehouse.

To avoid the need to deploy different versions of the applications 152 and/or 156 in response to the above changes in input data requirements, the input service 144 configures the processor 104 to control different ones of the input assemblies 112, 116, 120 and 124 to populate the above-mentioned input fields. Which input assemblies are employed for which input fields is determined by the processor 104 via execution of the input service 144 based on the contents of the repository 148. Both the process for controlling input assemblies to provide input data to the client applications 152 and 156, and the process of configuring the contents of the repository 148, will be discussed below in greater detail.

Figure 2:
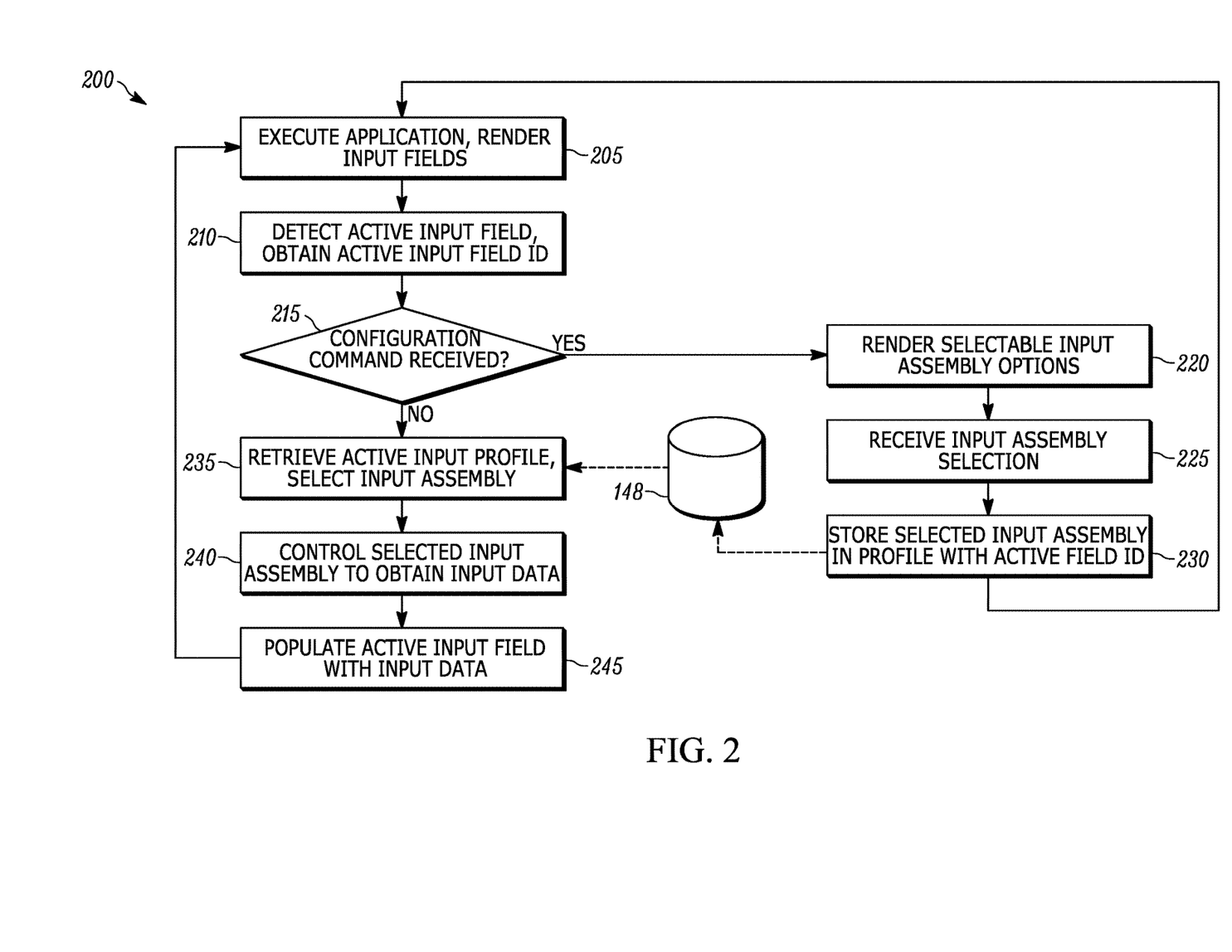
FIG. 2 is a flowchart of a method for providing multimodal input data to client applications of the data capture device of FIG. 1.

Turning now to FIG. 2, a method 200 of providing multimodal input data to client applications is illustrated. The method 200 will be described in conjunction with its performance on the data capture device 100 as illustrated in FIG. 1

At block 205, the processor 104 is configured to execute a client application, and to render a plurality of input fields defined by the application. Each of the client applications 152 and 156, as mentioned above, define input fields for receiving input data (e.g. serial numbers, locations and the like). In particular, each client application defines at least one page (e.g. a window for presentation on the display 110, which may also be referred to as an "activity" in connection with a data capture device 100 running the Android™ operating system). Each page typically contains at least one input field, and certain pages contain at least two input fields.

Figure 3A:
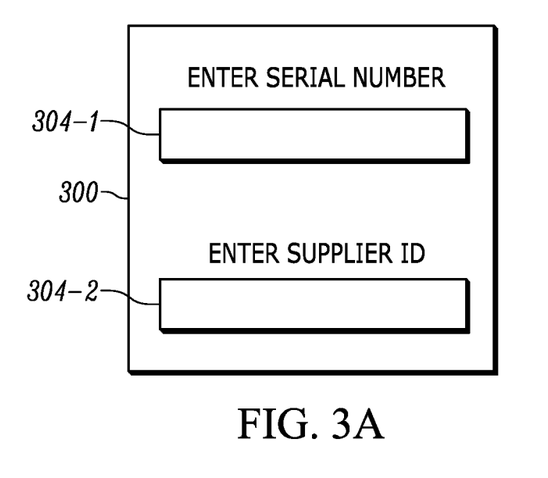
FIGS. 3A and 3B are diagrams illustrating pages rendered on a display of the data capture device during the performance of the method of FIG. 2.

Turning to FIG. 3A, a page 300 defined by the client application 152 is illustrated as presented on the display 110 responsive to execution of the client application 152 by the processor 104. The page 300 includes first and second input fields 304-1 and 304-2, respectively. As indicated by the descriptive text of the page 300, the first field 304-1 prompts the operator of the data capture device 100 to enter a serial number (e.g. of a product), and the second field 304-2 prompts the operator to enter a supplier identifier corresponding, for example, to a manufacturer of the product.

Returning to FIG. 2, at block 210 the processor 104 is configured to detect an active one of the input fields 304, and to obtain an identifier of the active input field. An input field is active when it has received focus, such that input data received via an input assembly will be employed to populate the active field (rather than any other input field presented on the display 110). The processor 104 is configured to perform block 210, in the present example, via execution of the input service 144 simultaneously with the execution of the client application 152.

Figure 4:
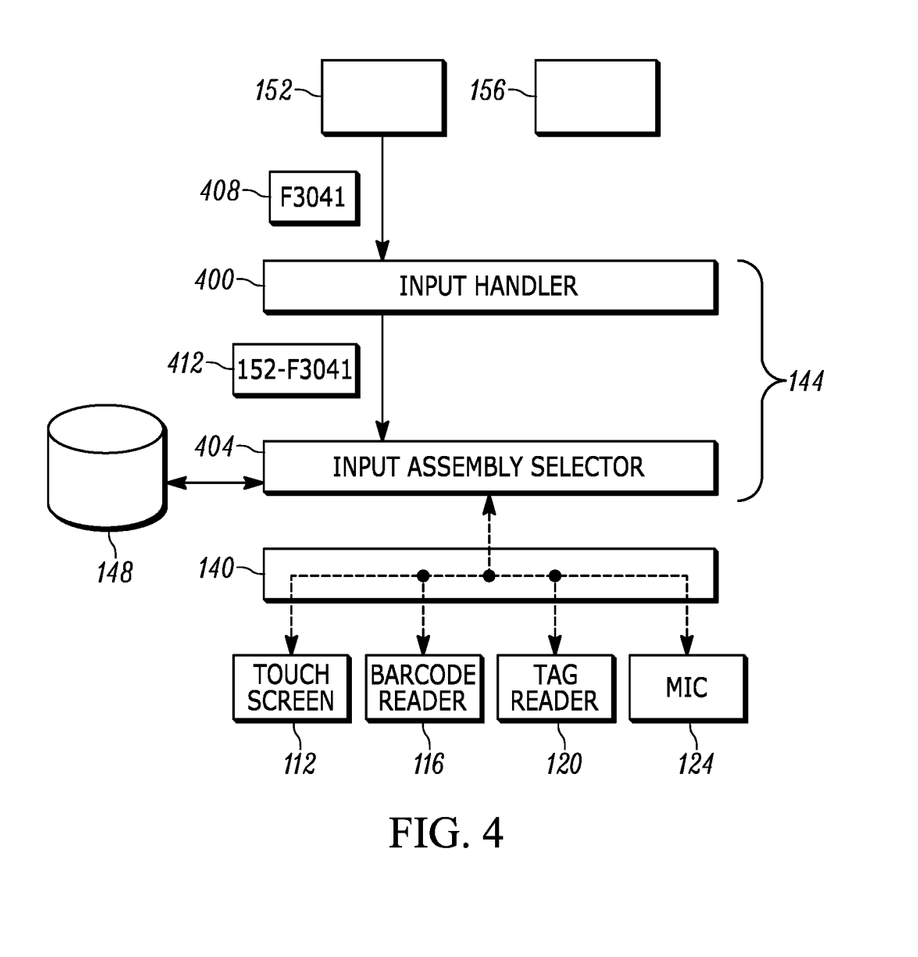
FIG. 4 is a schematic diagram of certain internal components of the data capture device of FIG. 1.

Turning to FIG. 4, a schematic diagram illustrates interactions between the various applications executed on the data capture device (the client applications 152 and 156, the input service 144, the operating system 140) to obtain input data via the input assemblies 112, 116, 120 and 124 for populating input fields presented on the display 110.

In particular, as shown in FIG. 4, the input service 144 and the operating system 140 intermediate between the input assemblies and the applications 152, 156. The client applications 152 and 156 are therefore not required to include instructions for interacting with any specific input assemblies. Instead, the client applications 152 and 156 need only invoke a component of the input service 144. The input service 144 itself is configured to select an appropriate one of the input assemblies based on the active input field and the repository 148. The input service 144 further includes instructions for interacting with the input assemblies 112, 116, 120, 124 via the operating system 140 (which, as will be apparent to those skilled in the art, typically includes device drivers and the like for controlling the input assemblies).

The input service 144 includes an input handler 400 configured to receive identifiers of active fields from the client applications 152 and 156, and to return input data to the client applications 152 and 156, for populating the active fields. The input handler 400, which may also be referred to as an input method editor (IME) (e.g. when the operating system 140 is based on the Android™ operating system), can define one or more soft keyboards for rendering on the display 110 to receive input data in the form of key selections. The input handler 400 can therefore return input data as keystrokes to the client applications 152 and 156.

The input handler 400 is also configured, in addition to providing soft keyboard functionality to the client applications 152 and 156, to pass active field identifiers to an input assembly selector 404 of the input service 144. The active field identifier passed to the input assembly selector 404 may be the same as the field identifier received from the client application 152. In the present example, however, the input handler 400 is configured to generate an active field identifier by combining a field identifier 408 received from the client application 152 with an identifier of the client application 152 itself. The resulting active field identifier 412 uniquely identifies the relevant input field within the data capture device 100.

The input assembly selector 404 is configured to receive the above-mentioned active field identifiers (e.g. the active field identifier 412) from the input handler 400, and to select, based on the input profile repository 148, one of the input assemblies 112, 116, 120, 124 to control for obtaining input data. Input data obtained via the selected input assembly is returned to the input handler 400, for delivery to the relevant client application 152, 156. In addition, as will be described below, the input assembly selector 404 and the input handler 400 are configured to enable the configuration of the repository 148 (i.e. modification of the contents of the repository 148).

The input service 144 is illustrated as the input handler 400 and the input assembly selector 404 by way of example only. In other embodiments, the input service 144 can be implemented as more or fewer components than those shown in FIG. 4.

Returning to FIG. 3A, in the present example performance of block 210 it is assumed that the input field 304-1 receives focus. The client application 152 can be configured to automatically place focus on the input field 304-1, or the field 304-1 can be placed in focus via input received at the touch screen 112. As will now be understood in light of the discussion of FIG. 4 above, upon activation (i.e. receipt of focus) of the input field 304-1, the client application 152 is configured to transmit the field identifier 408 to the input handler 400. In the present example, it is further assumed that the repository 148 has not yet been configured. The input assembly selector 404, upon receipt of the active field identifier 412, is therefore configured to select a default input assembly (e.g. the touch screen 112), and the input handler 400 is configured to render a default soft keyboard on the display 110.

Figure 3B:
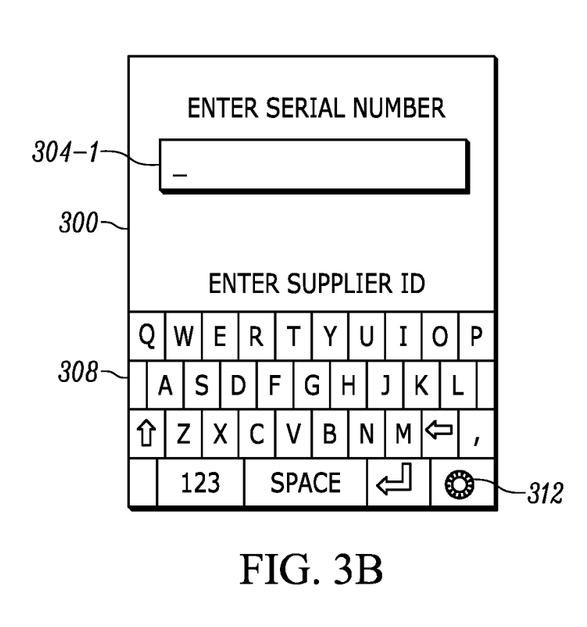

FIG. 3B illustrates a default soft keyboard 308 rendered on the display 110 over the page 300 (obscuring the input field 304-2) in response to activation of the input field 304-1. The default soft keyboard 308 includes, among other selectable soft keys, a selection configuration button 312 for configuring the repository 148. In particular, selection of the configuration button 312 enables the generation of an input profile corresponding to the input field 304-1.

Returning to FIG. 2, at block 215 the data capture device 100 is configured to determine whether a configuration command has been received, for configuring (i.e. creating, deleting or altering) input profiles in the repository 148. In the present example, the determination at block 215 is a determination of whether the configuration button 312 has been selected following activation of the input field 304-1. Various other mechanisms for initiating configuration may also be employed, in addition to or instead of the configuration button 312.

Figure 5A:
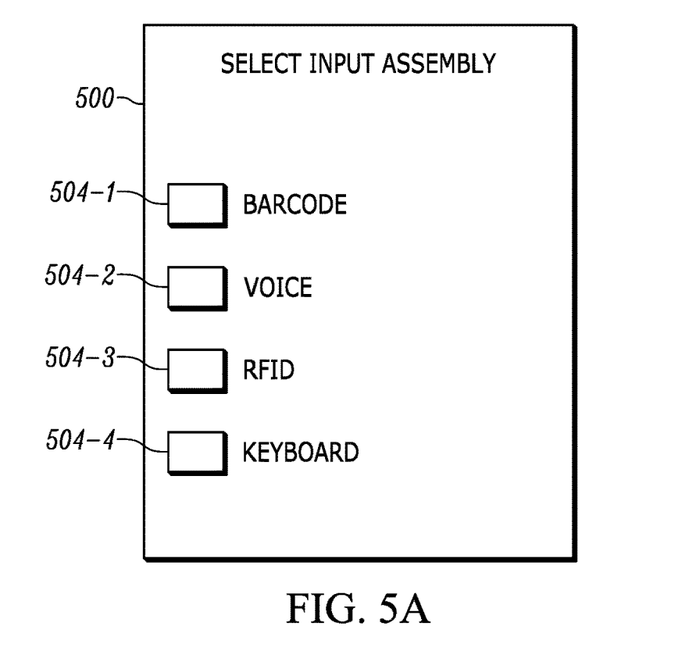
FIGS. 5A and 5B are diagrams illustrating further pages rendered on a display of the data capture device during the performance of the method of FIG. 2.

In the present example performance of the method 200, the configuration button 312 is selected and the determination at block 215 is therefore affirmative. Following an affirmative determination at block 215, the performance of the method 200 proceeds to block 220. At block 220, the processor 104, via execution of the input handler 400 and the input assembly selector 404, is configured to render selectable input assembly options on the display 110. Turning to FIG. 5A, an input assembly selection page 500 is shown, including selectable options 504-1, 504-2, 504-3 and 504-4 for the input assemblies 116, 124, 120 and 112 respectively. The input assembly selector 404 can be configured to generate the options 504 based on which input assemblies are available on the data capture device 100.

Figure 5B:
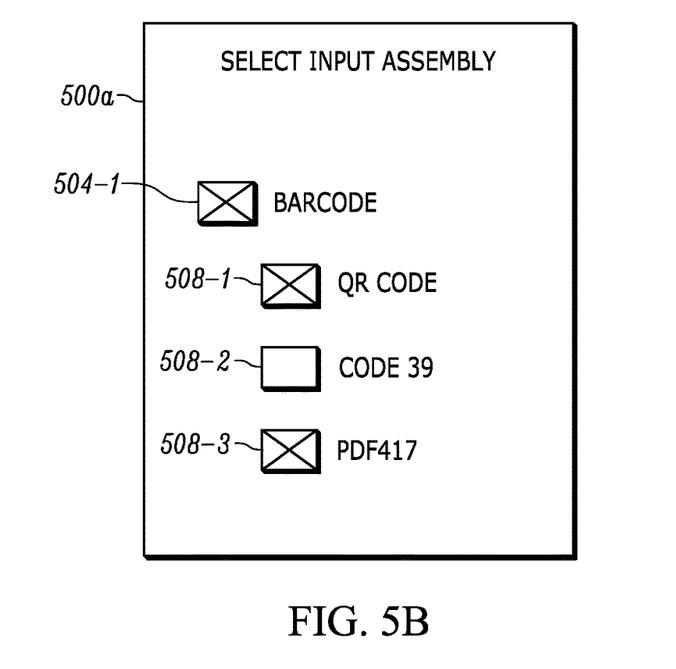

Returning to FIG. 2, at block 225 the processor 104 is configured to receive an input assembly selection from among the selectable options rendered at block 220. The selection received at block 225 can also include the receipt of configuration parameters for the selected input assembly. FIG. 5B illustrates the selection of the option 504-1, corresponding to the input assembly 116 (i.e. the barcode reader). Responsive to selection of the option 504-1, an updated page 500a is rendered that includes selectable configuration options 508-1, 508-2, 508-3 corresponding to the input assembly 116. In particular, the options 508 identify barcode symbologies to be activated upon selection, or deactivated upon deselection. Various other configuration parameters will also occur to those skilled in the art based on the discussion above. For example, in the case of a keyboard (e.g. selection of the option 504-4) a set of configuration parameter options can be presented to select one of a set of keyboard layouts provided by the input handler 400, for use in populating the input field 304-1.

Referring again to FIG. 2, at block 230 the processor 104 is configured to store the active field identifier 412 and a modality identifier corresponding to the selected input assembly in an input profile of the repository 148. When configuration parameters are selected at block 225, the configuration parameters are also stored in the input profile. Following the performance of block 230, the processor 104 can be configured to return to block 205, e.g. for configuration of another field such as the input field 304-2.

Table 1, below, illustrates example contents of the repository 148 following the performance of blocks 205-230 described above, as well as a second performance of blocks 205-230 to configure an input profile for the input field 304-2.

TABLE 1

Example Input Profile Repository 148

| Active Field ID | Profile ID | Input Assembly | Parameters |
|---|---|---|---|
| 152-f3041 | BarcodeProfile1 | 116 | QR; PDF417 |
| 152-f3042 | RFIDProfile1 | 120 | |

As seen above, each input profile contains at least one active field identifier corresponding to an input field 304. In addition, each input profile contains a modality identifier corresponding to the input assembly selected for the input profile, as well as any configuration parameters (e.g. the indication of active barcode symbologies in the profile "BarcodeProfile1". Each input profile can also contain a profile identifier, which may be received via the keyboard 308. In other examples, the repository 148 need not be structured as shown above. For example, a first table (or any other suitable data structure) can contain active field identifiers and corresponding profile identifiers, while a second table can contain the modality identifiers and configuration parameters for each profile identifier. Thus, more than one active field identifier can be assigned to a given input profile. Association of more than one active field identifiers with a single input profile can be accomplished, for example, by determining following block 225 whether any input profiles already exist in the repository 148 containing the selected input assembly and configuration parameters from block 225. When such an input profile exists, at block 230 the current active field identifier can be added to the input profile, rather than creating a new input profile.

Returning again to FIG. 2, a further performance of the method 200 will be discussed following configuration of the repository 148 as described above. At blocks 205 and 210, as discussed above, the client application 152 is executed to render the input fields 304-1 and 304-2, and the input field 304-1 receives focus. The field identifier 408 as shown in FIG. 4 is therefore provided to the input handler 400 by the client application 152, and the active field identifier 412 is provided by the input handler 400 to the input assembly selector 404.

Following a negative determination at block 215, the processor 104 is configured to proceed to block 235. At block 235, the input assembly selector 404 is configured to retrieve an active input profile from the repository 148, corresponding to the active field identifier 412 obtained at block 210. In the present example, therefore, at block 235 the input profile shown in the first row of Table 1 is retrieved, as that input profile ("BarcodeProfile1") contains an active field identifier that matches the active field identifier 412.

Figure 6:
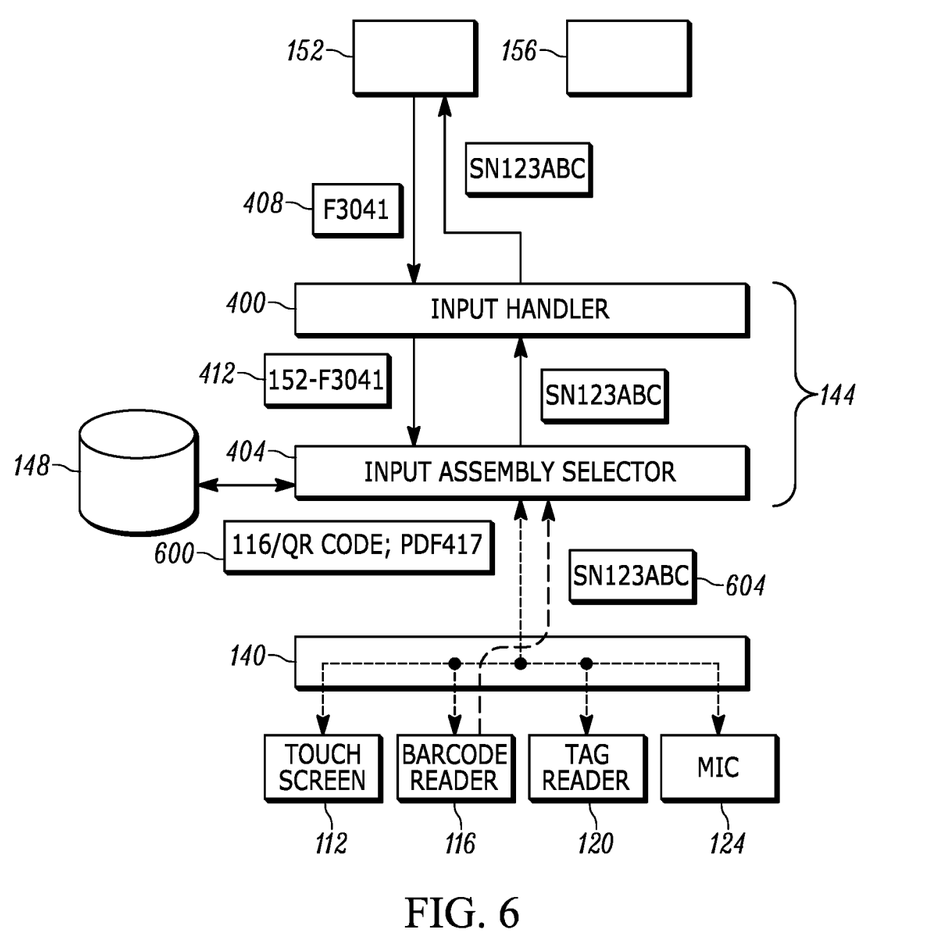
FIG. 6 is a schematic diagram of certain internal components of the data capture device of FIG. 1 during the performance of the method of FIG. 2.

Referring to FIG. 6, the architectural diagram of FIG. 4 is reproduced, illustrating the exchange of data between the components of the data capture device 100 during the present example performance of the method 200. In particular, following the receipt of the field identifier 408 and the unique active field identifier 412, profile parameters 600 are retrieved from the repository 148 at block 235, for use in controlling the relevant input assembly.

At block 240, the input assembly selector 404 is configured to control the selected input assembly identified in the profile retrieved at block 235 to obtain input data. In the present example, therefore, the input assembly selector 404 is configured to control (e.g. via the operating system 140) the barcode reader 116 to capture and decode any barcodes having the QR Code or PDF 417 symbologies within a field of view of the barcode reader 116. In response, the input assembly selector is configured to receive input data 604 in the form of a serial number "SN123ABC" decoded from a barcode captured by the barcode reader 116.

Figure 7A:
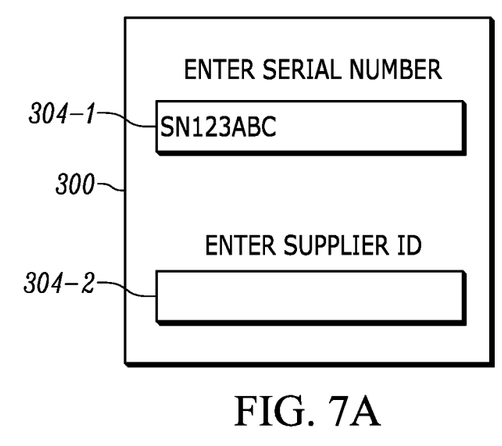
FIG. 7A and FIG. 7B are diagrams illustrating additional pages rendered on a display of the data capture device during the performance of the method of FIG. 2.

At block 245, the input data 604 is returned to the client application 152 via the input handler 400, for populating the active input field (i.e. the input field 304-1 in the present example). FIG. 7A illustrates the window 300 following the performance of block 245, with the serial number mentioned above populating the input field 304-1. The population of the input field with the input data can be accompanied by the generation of an output signal, such as an audible tone, vibration or the like.

Figure 7B:
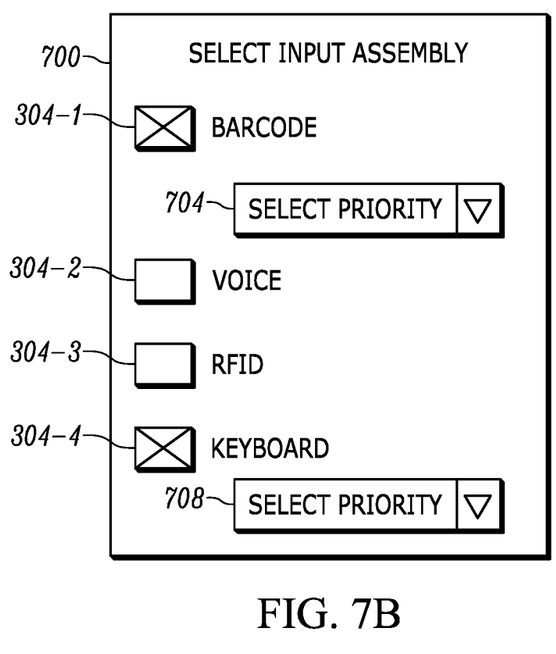

Variations to the above methods are contemplated. For example, in some implementations one or more input profiles can include a plurality of modality identifiers, with each modality identifier associated with a priority indicator. At block 240, the input assembly selector 404 can be configured to select the modality identifier having the highest priority indicator, and to then select the modality identifier having the next highest priority indicator only in response to a failure to obtain input data with the highest-priority modality identifier. For example, an input profile may identify the barcode reader 116 as having a first priority, and the touch screen 112 (e.g. with a keyboard identifier) as having a second priority. Responsive to a failed barcode capture operation (e.g. because a barcode is damaged and cannot be read) the input assembly selector 404 is configured to enable a soft keyboard (e.g. via the input handler 400) for entry of the necessary data. FIG. 7B illustrates the above variation, in which a page 700 is presented on the display 110 including selectable input assembly options. Upon selection of an option, a selectable priority element (e.g. a drop-down menu) can be presented for selecting a priority indicator associated with the input assembly option.

In further variations, the repository 148 can be received for storage in the memory 108 from another computing device, such as the server 132. That is, a given data capture device 100 can be operated to configure the repository 148 and to then upload the repository 148 to the server 132 for distribution to other data capture devices.

In other embodiments, configuration of input profiles in the repository 148 can be performed via a computing device external to the data capture device 100. Examples of the external computing device include the server 132 mentioned above, as well as a desktop computer, laptop computer or the like connected to the data capture device 100 via the network 136 or via a local link (e.g. a Universal Serial Bus link, a Bluetooth link, or the like). In such embodiments, configuration can be initiated via connection of the external computing device to the data capture device 100, rather than selection of the configuration button 312 discussed above.

Following connection of the external computing device to the data capture device 100, the external computing device is configured to mirror the display 110 of the data capture device 100, and to present (e.g. simultaneously with the mirrored display) a configuration interface. Thus, for example, the external computing device can present the page 300 by mirroring the display of the data capture device 100, and can also present, e.g. simultaneously with the page 300, the pages 500, 500a and/or 700 for receiving configuration input corresponding to the page 300. The external computing device, for example via the mirroring functionality noted above, is therefore configured to manipulate the pages displayed by the data captured device 100 and to obtain field identifiers.

In other words, the external computing device can be configured to perform blocks 220, 225 and 230 of the method 200. The external computing device is further configured to provide the configured profile to the data capture device 100 at block 230. The configured profile can also be stored at the external computing device for deployment to other data capture devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of providing multimodal input data to client applications in a data capture device, the method comprising:
   storing, in a memory of the data capture device:
      a client application defining input fields; and
      a plurality of input profiles each containing (i) an input field identifier corresponding to one of the input fields, and (ii) a modality identifier corresponding to one of a plurality of input assemblies of the data capture device;
   via execution of the client application at a processor of the data capture device, controlling a display of the data capture device to simultaneously render a plurality of the input fields;
   at the processor, determining an active one of the rendered input fields and obtaining an active input field identifier of the active input field;
   retrieving, at the processor, an active one of the input profiles containing an input field identifier that matches the active input field identifier;
   at the processor, controlling one of the input assemblies corresponding to the modality identifier of the active input profile to obtain input data; and
   populating the active input field with the obtained input data,
   wherein:
      the modality identifier corresponds to the active input field identifier of the active input profile, and
      at least one of the input profiles includes a plurality of modality identifiers and, in association with each modality identifier, a priority indicator.

2. The method of claim 1, wherein at least one of the input profiles contains a plurality of input field identifiers.

3. The method of claim 1, further comprising obtaining the active input field identifier, retrieving the active input profile and controlling the one of the input assemblies by executing an input service at the processor simultaneously with the client application.

4. The method of claim 1, wherein controlling the input assembly comprises at least one of:
   controlling a barcode reader to capture and decode the input data from a barcode; and
   controlling a wireless tag reader to read the input data from a wireless tag.

5. The method of claim 1, further comprising: prior to storing the input profiles, receiving the input profiles from a server.

6. The method of claim 1, further comprising, prior to storing the plurality of input profiles, generating at least one of the plurality of input profiles by:
   via execution of the client application at the processor of the data capture device, controlling the display of the data capture device to simultaneously render the plurality of the input fields;
   at the processor, determining an active one of the rendered input fields and obtaining the active field identifier of the active input field;
   responsive to receiving a configuration command, rendering selectable input assembly options on the display, corresponding to respective ones of the input assemblies;
   receiving a selection of one of the selectable input assembly options; and
   storing the active field identifier and a modality identifier corresponding to the selected input assembly option in the at least one input profile.

7. The method of claim 6, wherein receiving the configuration command includes receiving a selection of a configuration element rendered on the display.

8. The method of claim 6, further comprising: receiving configuration parameters for the selected input assembly.

9. A data capture device, comprising:
   a display;
   a plurality of input assemblies;
   a memory storing:
      a client application defining input fields; and
      a plurality of input profiles each containing (i) an input field identifier corresponding to one of the input fields, and (ii) a modality identifier corresponding to one of a plurality of input assemblies of the data capture device; and
   a processor interconnected with the display, the input assemblies and the memory, the processor configured to:
      execute the client application to control the display to simultaneously render a plurality of the input fields;
      determine an active one of the rendered input fields and obtain an active input field identifier of the active input field;
      retrieve an active one of the input profiles containing an input field identifier that matches the active input field identifier;
      control one of the input assemblies corresponding to the modality identifier of the active input profile to obtain input data; and
      populate the active input field with the obtained input data,
      wherein:
         the modality identifier corresponds to the active input field identifier of the active input profile, and
         at least one of the input profiles includes a plurality of modality identifiers and, in association with each modality identifier, a priority indicator.

10. The data capture device of claim 9, wherein at least one of the input profiles contains a plurality of input field identifiers.

11. The data capture device of claim 9, wherein the processor is further configured, to obtain the active input field identifier, retrieve the active input profile and control the one of the input assemblies, to execute an input service simultaneously with the client application.

12. The data capture device of claim 9, wherein the processor is further configured to control the input assembly by at least one of:
   controlling a barcode reader to capture and decode the input data from a barcode; and
   controlling a wireless tag reader to read the input data from a wireless tag.

13. The data capture device of claim 9, wherein the processor is further configured to: prior to storing the input profiles, receive the input profiles from a server.

14. The data capture device of claim 9, wherein the processor is further configured, to generate at least one of the plurality of input profiles prior to storing the plurality of input profiles, to:
   execute the client application to control the display to simultaneously render the plurality of the input fields;
   determine an active one of the rendered input fields and obtain the active input field identifier of the active input field;

responsive to receiving a configuration command, render selectable input assembly options on the display, corresponding to respective ones of the input assemblies;

receive a selection of one of the selectable input assembly options; and store the active input field identifier and a modality identifier corresponding to the selected input assembly option in the at least one input profile.

15. The data capture device of claim 14, wherein the processor is further configured, to receive the configuration command, to receive a selection of a configuration element rendered on the display.

16. The data capture device of claim 14, wherein the processor is further configured to receive configuration parameters for the selected input assembly.

17. A non-transitory computer-readable medium storing instructions for execution by a processor of a data capture device to:

store, in a memory:
- a client application defining input fields; and
- a plurality of input profiles each containing (i) an input field identifier corresponding to one of the input fields, and (ii) a modality identifier corresponding to one of a plurality of input assemblies of the data capture device; and execute the client application to control a display to simultaneously render a plurality of the input fields;

determine an active one of the rendered input fields and obtain an active input field identifier of the active input field;

retrieve an active one of the input profiles containing an input field identifier that matches the active input field identifier;

control one of a plurality of input assemblies corresponding to the modality identifier of the active input profile to obtain input data; and populate the active input field with the obtained input data, wherein:
- the modality identifier corresponds to the active input field identifier of the active input profile, and
- at least one of the input profiles includes a plurality of modality identifiers and, in association with each modality identifier, a priority indicator.

18. The non-transitory computer-readable medium of claim 17, wherein the instructions further configure the processor, to generate at least one of the plurality of input profiles prior to storing the plurality of input profiles, to:

execute the client application to control the display to simultaneously render a plurality of the input fields;

determine an active one of the rendered input fields and obtain an active input field identifier of the active input field;

responsive to receiving a configuration command, render selectable input assembly options on the display, corresponding to respective ones of the input assemblies;

receive a selection of one of the selectable input assembly options; and store the active input field identifier and a modality identifier corresponding to the selected input assembly option in the at least one input profile.

* * * * *